(No Model.)
H. G. YATES.
BALL BEARING.
No. 468,067.  Patented Feb. 2, 1892.
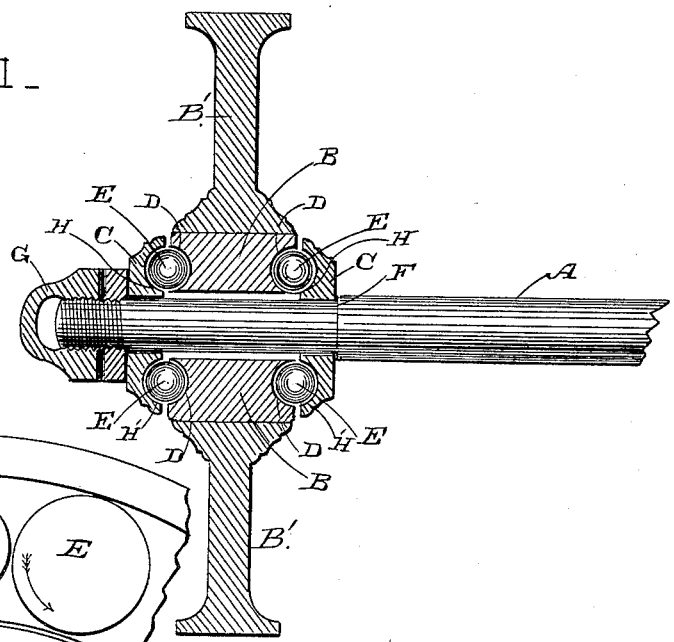
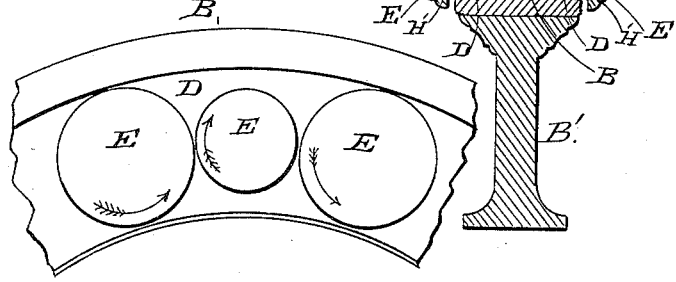
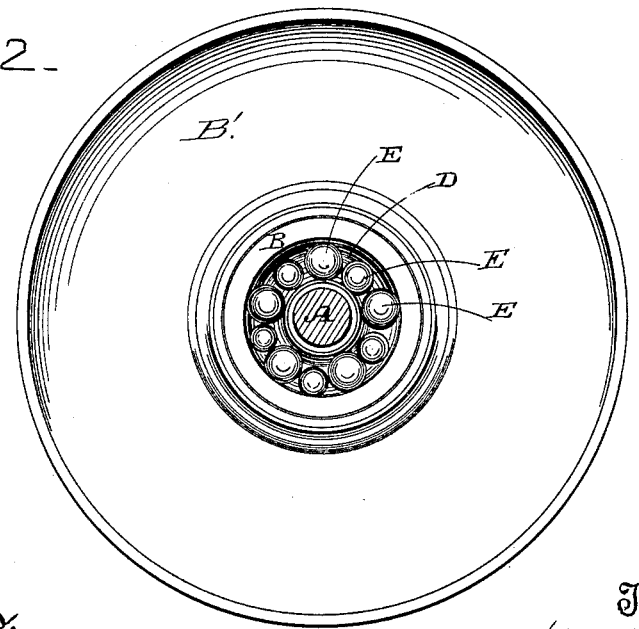
Witnesses,
J. H. Arnise
J. A. Bayless
Inventor,
Henry G. Yates
B. Dewey & Co.
Atty.

UNITED STATES PATENT OFFICE.

HENRY G. YATES, OF SAN FRANCISCO, CALIFORNIA, ASSIGNOR TO THE UNIVERSAL BALL BEARING WHEEL COMPANY, OF SAME PLACE.

BALL-BEARING.

SPECIFICATION forming part of Letters Patent No. 468,067, dated February 2, 1892.

Application filed February 25, 1891. Serial No. 382,760. (No model.)

*To all whom it may concern:*

Be it known that I, HENRY G. YATES, a citizen of the United States, residing in the city and county of San Francisco, State of California, have invented an Improvement in Ball-Bearings; and I hereby declare the following to be a full, clear, and exact description of the same.

My invention relates to certain improvements in that class of bearings in which the rotary wheel-shaft or other journal-bearing is carried upon anti-frictional balls.

It consists in certain details of construction which will be more fully explained by reference to the accompanying drawings, in which—

Figure 1 is a longitudinal vertical section of a wheel, showing my invention. Fig. 2 is a transverse section of the shaft with the collar C removed. Fig. 3 is an enlarged view of a part of the hub or journal-box.

In ball-bearings as usually constructed one or more rows of balls are fitted to travel in a groove or grooves formed upon the axle or a collar which is fixed to the axle and are inclosed in an exterior casing similarly grooved, so that the outer peripheries of the balls run in contact with the interior wall of the casing. The weight of the moving part is thus carried upon the balls which are at that time passing between the surfaces which are forced toward each other by the weight, and as soon as they have passed this point others take their place, and the remainder of the balls traveling around in the circle are comparatively free from the weight, so that, although turning in opposite directions, there is comparatively little friction between their rubbing-surfaces.

In my invention I have shown a hub carrying a wheel or pulley B' and turning about a shaft which is of smaller diameter than the bore of the hub. Semi-cylindrical grooves are made in the ends of the hub, and the balls are retained between the grooves in the hub ends and corresponding grooves in collars which fit the axle and abut against the hub ends, so that when properly adjusted the hub is carried upon the balls out of contact with the axle, and is practically supported upon all points within the collars instead of at a single point, as in the ordinary construction.

In the present case I have shown my device illustrated in this manner: A is the shaft, having a suitable cylindrical journal turned at one end to receive the hub B, to which a pulley or wheel B' is shrunk or otherwise rigidly secured, said hub also carrying the collars C C. The hub is bored out to have a diameter larger than that of the shaft, so that when properly supported by the balls it rests upon them and out of contact with the shaft. The collars C C are bored to just fit the shaft, upon which they may also rotate, if desired. In the ends of the hub are formed the semi-tubular curved grooves or channels D of sufficient depth and diameter to allow balls of such size as is found desirable to fit these grooves or channels, which extend around a circle slightly smaller than the exterior diameter of the hub or journal. The collars C have corresponding grooves or channels made in their faces which are adjacent to the ends of the hub, and balls E are fitted to run in these grooves or channels. The collars are adjusted to or from the hub, so that the latter will turn easily upon the balls without binding or without too much play. In the present case I have shown the inner collar as abutting against a shoulder F of the shaft, and the outer collar and hub are held in suitable relation with it by means of the nut G, which screws upon the outer end of the shaft, and by which the adjustment is made. It will be manifest that the adjustment may be made in other ways; but this is the simplest and most convenient. When the hub and collars are properly adjusted with relation to each other and the shaft is running in a horizontal position, the hub will be supported upon the balls E entirely out of contact with the shaft. It will be seen from the construction of the collars and the hub that if the weight is upon the hub it will be supported by the balls in the top of the channel resting upon the top of the central projecting flanges H of the collars and also upon the bottom flanges of the collars, the pressure being practically distributed outward from these two points, so that the bearing is in reality distributed throughout the whole circumference of the ball-channels of the collars, the upper portion of the interior flanges receiving a certain portion of the weight and the lower circumference of the outer flanges of the grooves supporting the remainder.

In order to prevent the friction caused by the balls turning in opposite directions and abutting against each other within the grooves or channels, I have shown each alternate ball as made of smaller diameter than the adjacent ones, and it will be seen from this construction that the opposite movements of these two larger balls will cause the intermediate ball to rotate between them with a rolling friction, as one side of it will have the movement in the direction of rotation of one of the balls and the other side will receive a movement in the opposite direction from the opposite ball, as is plainly illustrated in the outline sketch, Fig. 3. By this reducing of the movement of the bearing to a rolling friction I am enabled to dispense with all lubricants which have hitherto been necessary, even in the most approved forms of ball-bearings, on account of the rubbing friction before referred to.

When the parts are properly adjusted, there will be a narrow space between the ends of the journal-box and the collars, so that any dirt or dust which may gather in the ball-channels will easily work out through the spaces.

Having thus described my invention, what I claim as new, and desire to secure by Letters Patent, is—

In an anti-friction bearing, a shaft having collars fitting loosely upon it with circular semi-cylindrical grooves made in their inner faces, a pulley or wheel hub with corresponding grooves made in its ends, said hub having a hole through it of larger diameter than the shaft, and balls fitting the grooves in the collars and hub ends, whereby the hub is suspended and rotates free from the shaft, and spaces are left between the hub ends and collars for the escape of dust, substantially as herein described.

In witness whereof I have hereunto set my hand.

HENRY G. YATES.

Witnesses:
 H. J. LANG,
 GEO. T. KNOX.